US 10,916,379 B2

(12) United States Patent
Pillonnet et al.

(10) Patent No.: US 10,916,379 B2
(45) Date of Patent: Feb. 9, 2021

(54) ELECTROMECHANICAL VARIABLE-CAPACITANCE CAPACITOR WITH FOUR ELECTRODES

(71) Applicant: Commissariat à l'Énergie Atomique et aux Énergies Alternatives, Paris (FR)

(72) Inventors: Gaël Pillonnet, Sassenage (FR); Philippe Basset, Fontenay-sous-Bois (FR); Hervé Fanet, Revel (FR); Hatem Samaali, Ezzahra (TN)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 46 days.

(21) Appl. No.: 16/006,576

(22) Filed: Jun. 12, 2018

(65) Prior Publication Data
US 2018/0366272 A1 Dec. 20, 2018

(30) Foreign Application Priority Data

Jun. 15, 2017 (FR) ...................... 17 55419

(51) Int. Cl.
*H01G 5/16* (2006.01)
*H01G 5/14* (2006.01)
(Continued)

(52) U.S. Cl.
CPC ............... *H01G 5/16* (2013.01); *H01G 5/011* (2013.01); *H01G 5/019* (2013.01);
(Continued)

(58) Field of Classification Search
CPC . H01G 7/06; H01G 5/16; H01G 5/011; H01G 5/0136; H01G 5/019; H01G 5/14; H01G 5/145
(Continued)

(56) References Cited

U.S. PATENT DOCUMENTS 7,615,970 B1 * 11/2009 Gimlan ................. H01G 5/012
320/166
2004/0036132 A1 2/2004 de los Santos
(Continued)

FOREIGN PATENT DOCUMENTS

EP          3 182 590 A1    6/2017
KR     2011 0130626 A      12/2011
WO    WO 2006/046192 A1   5/2006

OTHER PUBLICATIONS

French Search Report for Application No. FR 1755419 dated Mar. 21, 2018.

*Primary Examiner* — Michael P McFadden
(74) *Attorney, Agent, or Firm* — Wolf, Greenfield & Sacks, P.C.

(57) ABSTRACT

A variable-capacitance capacitor having first and second electrodes mobile with respect to each other and third and fourth electrodes insulated from the first and second electrodes, capable of receiving a control signal to vary the relative position of the first and second electrodes in order to vary the capacitance between the first and second electrodes, the capacitor further including a system for controlling the position of the second electrode with respect to the first electrode, the system being arranged so that, for at least one relative position of the second electrode with respect to the first electrode, the position of the second electrode with respect to the first electrode is independent from the voltage between the first and second electrodes.

9 Claims, 4 Drawing Sheets

(51) Int. Cl.
*H01G 5/019* (2006.01)
*H01G 5/011* (2006.01)
*H01G 5/013* (2006.01)

(52) U.S. Cl.
CPC ............ *H01G 5/0136* (2013.01); *H01G 5/14* (2013.01); *H01G 5/145* (2013.01)

(58) Field of Classification Search
USPC ........................................................ 361/290
See application file for complete search history.

(56) References Cited

U.S. PATENT DOCUMENTS

| | | |
|---|---|---|
| 2004/0246653 A1 | 12/2004 | Williams |
| 2010/0038753 A1 | 2/2010 | Ni |
| 2010/0315757 A1 | 12/2010 | Yamazaki |
| 2011/0043960 A1 | 2/2011 | Ikehashi |
| 2011/0188168 A1* | 8/2011 | Rogers ................... H01G 5/18 361/281 |
| 2011/0193501 A1 | 8/2011 | Ikehashi |
| 2014/0002948 A1 | 1/2014 | Yoon et al. |
| 2014/0152400 A1* | 6/2014 | Rogers ................... H01P 1/18 333/156 |
| 2014/0268482 A1 | 9/2014 | DeReus et al. |

* cited by examiner

ELECTROMECHANICAL VARIABLE-CAPACITANCE CAPACITOR WITH FOUR ELECTRODES

This application claims the priority benefit of French patent application number 17/55419, the contents of which is hereby incorporated by reference in its entirety to the maximum extent allowable by law.

BACKGROUND

The present disclosure relates to the field of variable-capacitance capacitors. It more particularly aims at an electromechanical variable-capacitance capacitor with four electrodes.

DISCUSSION OF THE RELATED ART

French patent application Nr. 1562812 filed on Dec. 18, 2015 describes embodiments of logic circuits based on variable-capacitance capacitors, and more particularly based on variable-capacitance capacitors comprising two main electrodes separated by an insulating region, and two control electrodes electrically insulated from the main electrodes and capable of receiving a control signal to vary the capacitance between the main electrodes.

FIG. 1 schematically illustrates such a capacitor with four electrodes. In FIG. 1, the main electrodes are designated with references S and D, and the control electrodes are designated with references R and G. Capacitance Cs between main electrodes S and D of the capacitor is a function of an electric control signal applied between its control electrodes R and G.

Above-mentioned French patent application Nr. 1562812 describes embodiments of variable-capacitance capacitors with four electrodes of electromechanical type, that is, where main electrodes S and D are mobile with respect to each other, and the control signal applied between electrodes R and G enables to vary the relative position of electrodes S and D to vary capacitance Cs.

FIGS. 2A and 2B are cross-section views of an example of an electromechanical variable-capacitance capacitor with four electrodes of the type described in French patent application Nr. 1562812.

The capacitor of FIGS. 2A and 2B comprises a fixed portion and a mobile portion.

The fixed portion comprises a conductive plate 201 forming the first main electrode S of the capacitor and a dielectric layer 203 coating a surface of plate 201. The fixed portion of the capacitor further comprises a conductive plate 205 mechanically fastened to plate 201, forming the first control electrode G of the capacitor. Plates 201 and 205 are substantially parallel to each other and are not on top of each other. An insulating part 207 separates plate 201 from plate 205 so that plate 201 is electrically insulated from plate 205.

The mobile portion of the capacitor comprises a conductive plate 209 forming the second main electrode D of the capacitor. Plate 209 is substantially parallel to plates 201 and 205, and faces plate 201, on the side of the surface of plate 201 coated with dielectric layer 203. The mobile portion of the capacitor further comprises a conductive plate 211 mechanically fastened to plate 209, forming the second control electrode R of the capacitor. Plates 209 and 211 are substantially parallel to each other and are not on top of each other. An insulating part 213 separates plate 209 from plate 211 so that plate 209 is electrically insulated from plate 211. Plate 211 faces plate 205, on the same side of plate 205 as plate 209.

The mobile portion of the capacitor is capable of moving with respect to the fixed portion, in translation along a direction substantially orthogonal to conductive plates 205 and 201, to bring plates 209 and 211 closer to from plates 201 and 205 or draw them away therefrom. A return spring (not shown) may be provided in order to maintain conductive plates 209 and 211 in an idle position, for example, a position distant from conductive plates 201 and 205, in the absence of a biasing of the capacitor electrodes, as illustrated in FIG. 2A.

The application of a control voltage Ue between electrodes G and R (referenced to electrode G) causes the occurrence of an electrostatic force between conductive plates 211 and 205, tending to bring plate 211 closer to plate 205, and thus plate 209 closer to plate 201, for example, to place plate 209 in contact with dielectric layer 203 coating plate 201. This results in an increase in the value of capacitance Cs formed between main electrodes S and D of the capacitor. Such a configuration is illustrated in FIG. 2B. A decrease in control voltage Ue conversely results in drawing plate 209 away from plate 201, under the effect of the force exerted by the return spring, which is then no longer compensated by the electrostatic force between conductive plates 211 and 205. This results in a decrease in the value of capacitance Cs formed between electrodes S and D.

A limitation of the capacitor of FIGS. 2A and 2B and, more generally, of all the examples of variable-capacitance electromechanical capacitors with four electrodes described in above-mentioned French patent application Nr. 1562812, is that, whatever the value of the control signal applied between the control electrodes of the capacitor, the value of capacitor Cs actually not only depends on this control signal, but also on the voltage Us applied between the main electrodes S and D of the capacitor. Indeed, the application of a voltage Us between electrodes S and D causes the occurrence of an electrostatic force between conductive plates 201 and 209, which may result in bringing plate 209 closer to plate 201, or conversely in drawing plate 209 away from plate 201, thus modifying the value of capacitance Cs.

Such a dependence of capacitance Cs on voltage Us may in certain cases raise an issue, in the capacitive logic applications described in French patent application Nr. 1562812.

It would thus be desirable to have an electromechanical variable-capacitance capacitor with four electrodes where, for at least one configuration of the capacitor, the value of the capacitance formed between the main electrodes of the capacitor is independent from the voltage applied between said main electrodes.

SUMMARY

Thus, an embodiment provides a variable-capacitance capacitor having first and second electrodes mobile with respect to each other, separated by an insulating region, and third and fourth electrodes electrically insulated from the first and second electrodes, capable of receiving a control signal to vary the relative position of the first and second electrodes in order to vary the capacitance between the first and second electrodes, the capacitor further comprising a system for controlling the position of the second electrode with respect to the first electrode, said system being arranged so that, for at least one relative position of the second electrode with respect to the first electrode, the position of the second electrode with respect to the first electrode is independent from the voltage applied between the first and second electrodes.

According to an embodiment:

the first electrode comprises two first conductive plates;

the second electrode comprises a second conductive plate substantially parallel to the first conductive plates and arranged between the first conductive plates; and the control system is an electrostatic system such that, for at least one configuration of the capacitor, whatever the voltage applied between the first and second electrodes, the electrostatic force exerted on the second conductive plate by one of the first conductive plates compensates for the electrostatic force exerted on the second conductive plate by the other first conductive plate.

According to an embodiment, in said at least one configuration, the second conductive plate is substantially at an equal distance from the two first conductive plates.

According to an embodiment, the second conductive plate is mobile in translation along a direction substantially orthogonal to the first and second conductive plates, to vary the distance between the second conductive plate and the first conductive plates without varying the surface of the second conductive plate facing the first conductive plates.

According to an embodiment:

the first electrode comprises at least one first conductive plate;

the second electrode comprises at least one second conductive plate substantially parallel to the first conductive plate; and the control system mechanically couples the second electrode to the first electrode to allow a motion of the second electrode with respect to the first electrode in translation along a direction substantially parallel to the first and second conductive plates, in order to vary the surface area of said at least one second conductive plate facing said at least one first conductive plate, and to prevent or limit any other motion of the second electrode with respect to the first electrode.

According to an embodiment:

the first electrode comprises first and second conductive parts facing each other, each having, in transverse cross-section, the shape of a comb with simple teeth; and the second electrode comprises a third conductive part located between the first and second conductive parts and having, in transverse cross-section, the shape of a comb with double teeth.

According to an embodiment, the third electrode comprises a third conductive plate mechanically fastened to the second electrode and the fourth electrode comprises a fourth conductive plate mechanically fastened to the first electrode, the third and fourth conductive plates being substantially parallel to each other.

According to an embodiment, the third and fourth electrodes are conductive terminals mechanically fastened to the first electrode, the capacitor further comprising a conductive coil coupling the third and fourth electrodes, and a magnet mechanically fastened to the second electrode, arranged inside of the coil.

According to an embodiment, the capacitor comprises a return spring arranged to maintain the first and second electrodes in an idle position in the absence of an electric signal applied between the third and fourth electrodes and between the first and second electrodes.

According to an embodiment, the return spring mechanically couples the second electrode to a point mechanically fastened to the first electrode, via a sliding joint.

The foregoing and other features and advantages will be discussed in detail in the following non-limiting description of specific embodiments in connection with the accompanying drawings.

DETAILED DESCRIPTION

Figure 1:
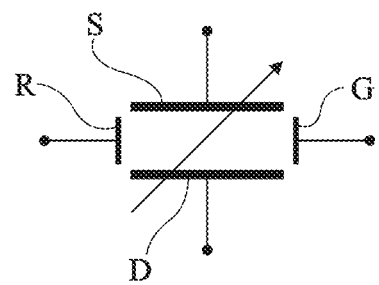
FIG. 1, previously described, schematically illustrates a variable-capacitance capacitor with four electrodes.
Figure 2A:
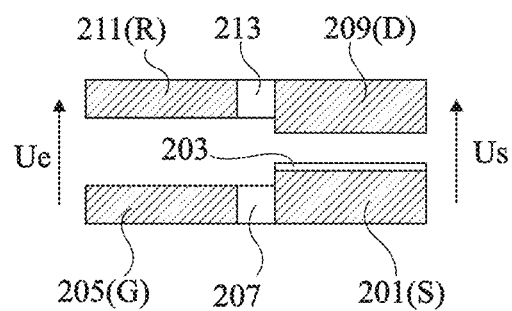
FIGS. 2A and 2B, previously described, are cross-section views of an example of an electromechanical variable-capacitance capacitor with four electrodes of the type described in French patent application Nr. 1562812.
Figure 2B:
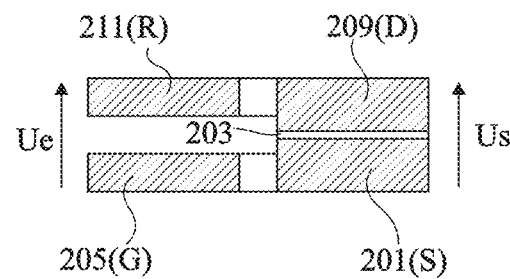

The same elements have been designated with the same reference numerals in the various drawings and, further, the various drawings are not to scale. For clarity, only those steps and elements which are useful to the understanding of the described embodiments have been shown and are detailed. In particular, the various uses which may be made of the electromechanical variable-capacitance capacitors with four electrodes described in the present application are not detailed. Such capacitors are particularly advantageous for a use in capacitive logic circuits of the type described in above-mentioned French patent application Nr. 1562812, but may also have other applications. As an example, such capacitors may be used as adjustable capacitive elements in filtering circuits, for example, in LC circuits having a variable resonance frequency. They then advantageously enable to adjust the resonance frequency of the circuit independently from the value of the DC voltage component seen by the capacitor. More generally, the described embodiments are compatible with most known applications using variable-capacitance capacitors.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings, it being understood that, in practice, the described devices may be oriented differently. The terms "approximately", "substantially", and "in the order of" are used herein to designate a tolerance of plus or minus 10%, preferably of plus or minus 5%, of the value in question, or when they relate to angle values or to orientations, a tolerance of plus or minus 10°, preferably of plus or minus 5°.

Figure 3A:
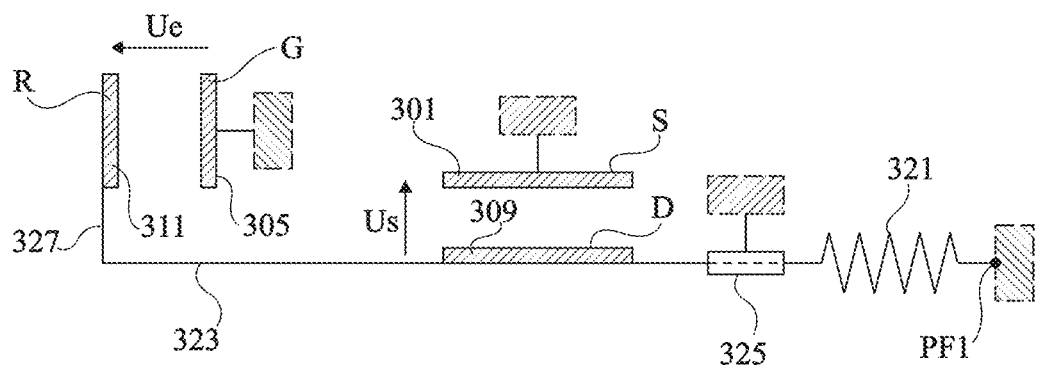
FIGS. 3A and 3B are cross-section views of an example of an electromechanical variable-capacitance capacitor with four electrodes according to an embodiment.
Figure 3B:
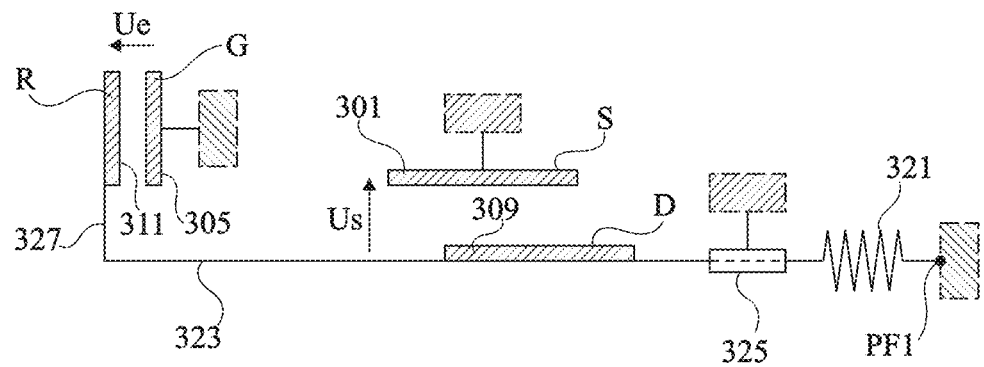

FIGS. 3A and 3B are cross-section views illustrating an example of an electromechanical variable-capacitance capacitor with four electrodes according to an embodiment.

The capacitor of FIGS. 3A and 3B comprises a fixed portion and a mobile portion.

The fixed portion comprises a conductive plate 301 forming the first main electrode S of the capacitor, and a conductive plate 305 mechanically fastened to conductive plate 301 but electrically insulated from plate 301, forming the first control electrode G of the capacitor. It should be noted that, in the present description, conductive plate means a plate made of a material capable of conducting electric charges, where such a material may be a conductive material, for example, a metal, or also a semiconductor material, for example, silicon.

The mobile portion of the capacitor comprises a conductive plate 309 electrically insulated from conductive plates 301 and 305 forming the second main electrode D of the capacitor. Conductive plate 309 is substantially parallel to conductive plate 301. As an example, the dimensions of conductive plate 309 are substantially identical to the dimensions of conductive plate 301. The mobile portion of the capacitor further comprises a conductive plate 311 mechanically fastened to conductive 309 but electrically insulated from plate 309. Conductive plate 311 is further electrically insulated from conductive plates 301 and 305. Conductive plate 311 forms the second control electrode R of the capacitor. Plate 311 is substantially parallel to plate 305 and faces plate 305. Plates 311 and 305 for example have substantially identical dimensions. As an example, in projection along an axis orthogonal to the planes of plates 305 and 311, plates 305 and 311 are substantially confounded.

In this example, conductive plates 311 and 305 are arranged in planes substantially orthogonal to the planes comprising plates 301 and 309. The mobile portions of the capacitor is capable of displacing in translation along a direction substantially orthogonal to the planes of plates 305 and 311 and parallel to the planes of plates 301 and 309. Thus, plate 311 may move away from or come closer to plate 305 and plate 309 may move parallel to plate 301 to vary the surface area of plate 309 facing plate 301. Plate 309 may move parallel to plate 301 to vary the surface of plate 309 facing plate 301. The distance between plate 309 and plate 301 is however substantially invariant.

The capacitor of FIGS. 3A and 3B further comprises a return spring 321 arranged to maintain the mobile portion of the capacitor in an idle position, for example, a position where the entire surface area of conductive plate 309 faces plate 301 as illustrated in FIG. 3A, in the absence of a control signal applied between electrodes R and G. In the shown example, the mobile portion of the capacitor comprises a first beam 323 coupled to a fixed point PF1 via return spring 321 and a sliding joint 325. Conductive plate 309 is rigidly assembled to beam 323 parallel to the longitudinal axis of beam 323. As an example, spring 321 is a tension or compression spring having one end coupled to fixed point PF1 and having its other end coupled to beam 323 via sliding joint 325. In this example, the axis of the sliding joint is substantially parallel to the longitudinal axis of the beam. Thus, beam 323 may displace only in translation along its longitudinal axis. In this example, the mobile portion of the capacitor further comprises a second beam 327 rigidly attached to beam 323 and arranged along a longitudinal axis substantially orthogonal to that of beam 323. Conductive plate 311 is rigidly assembled to beam 327, parallel to the longitudinal axis of beam 327.

The application of a control voltage Ue between electrodes G and R (referenced to electrode G), causes the occurrence of an electrostatic force between conductive plates 311 and 305, tending to bring plate 311 closer to plate 305. This causes a displacement of conductive plate 309 parallel to conductive plate 301, with no modification of the distance between plate 309 and plate 301. This results in a variation in the surface area of plate 309 facing plate 301, and thus in a corresponding variation of capacitance Cs of the capacitor between its main electrodes S and D, capacitance Cs being proportional to the surface area of plate 309 facing plate 301. Such a configuration is illustrated in FIG. 3B. A decrease in control voltage Ue conversely results in bringing conductive plate 309 back to its idle position, and thus in taking capacitance Cs back to its initial value.

An advantage of the capacitor of FIGS. 3A and 3B is that, whatever the value of control voltage Ue applied between control electrodes R and G of the capacitor, the value of capacitance Cs is independent from the value of voltage Us applied between the main electrodes S and D of the capacitor. This results from the fact that conductive plate 309 forming electrode D can only displace parallel to conductive plate 301 forming electrode S. The electrostatic force exerted by plate 301 on plate 309 under the effect of voltage Us, whatever the value of voltage Us, being a force orthogonal to plate 309, this force causes no displacement of plate 309 with respect to plate 301, and thus no variation of capacitance Cs.

It should be noted that in the example of FIGS. 3A and 3B, sliding joint 325 is optional. More generally, sliding joint 325 may be replaced with any other element of mechanical coupling between mobile conductive plate 309 and fixed conductive plate 301, capable of allowing a translating motion of plate 309 parallel to plate 301 and opposing any distance variation between plate 309 and plate 301. As an example, sliding joint 325 may be replaced with a spring (not shown), for example, a metal blade, having, along a main axis substantially orthogonal to beam 323, a first end fastened to beam 323 and a second end fastened to the fixed portion of the capacitor, such a spring having a stiffness which is relatively high along its main axis and relatively low along the axis of beam 323.

Figure 4A:
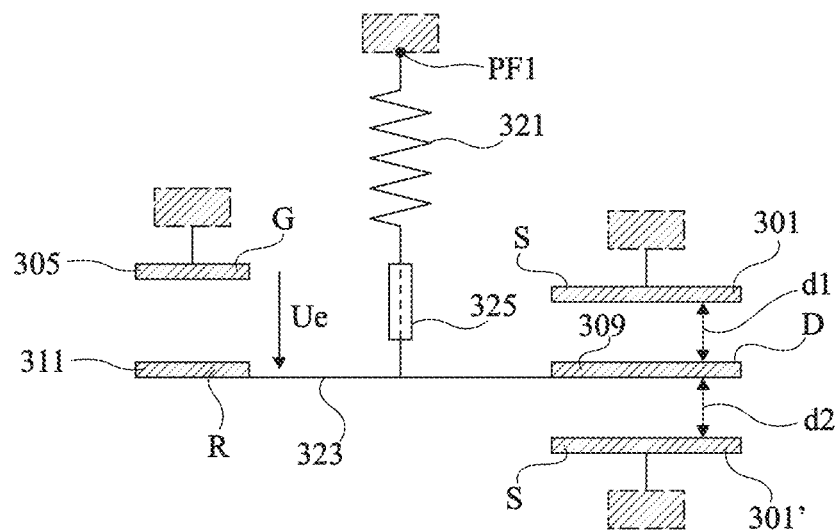
FIGS. 4A and 4B are cross-section views of another example of an electromechanical variable-capacitance capacitor with four electrodes according to an embodiment.
Figure 4B:
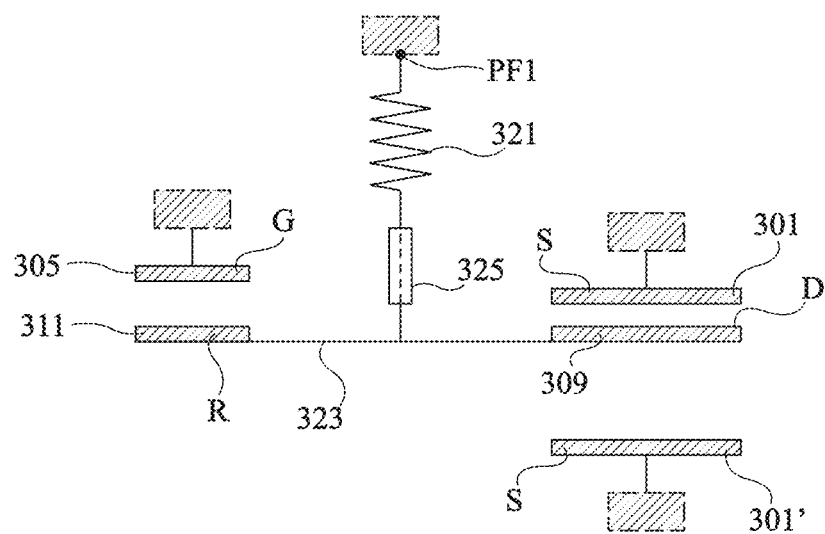

FIGS. 4A and 4B are cross-section views illustrating another example of an electromechanical variable-capacitance capacitor with four electrodes according to an embodiment.

The capacitor of FIGS. 4A and 4B comprises a fixed portion and a mobile portion.

The fixed portion comprises two parallel conductive plates 301 and 301'. Plate 301' faces plate 301. As an example, plates 301 and 301' have substantially the same dimensions and are, in projection along an axis orthogonal to the plane of plates 301 and 301', substantially confounded. Conductive plate 301' is electrically connected to conductive plate 301 by a conductive connector, not shown in the drawings, and forms with plate 301 electrode S of the capacitor.

The fixed portion of the capacitor of FIGS. 4A and 4B further comprises a conductive plate 305 mechanically fastened to conductive plates 301 and 301' but electrically insulated from plates 301 and 301', forming the first control electrode G of the capacitor.

The mobile portion of the capacitor comprises a conductive plate 309 electrically insulated from conductive plates 301, 301', and 305 forming the second main electrode D of the capacitor. Conductive plate 309 is substantially parallel to conductive plates 301 and 301' and is arranged between plates 301 and 301'. As an example, the dimensions of conductive plate 309 are substantially identical to the dimensions of conductive plates 301 and 301' and, in projection along an axis orthogonal to the planes of plates 301, 301' and 309, plates 301, 301' and 309 are substantially confounded.

The mobile portion of the capacitor further comprises a conductive plate 311 mechanically fastened to conductive plate 309 but electrically insulated from plate 309. Conductive plate 311 is further electrically insulated from conductive plates 301, 301', and 305. Conductive plate 311 forms the second control electrode R of capacitor. Plate 311 is substantially parallel to plate 305 and faces plate 305. Plates 311 and 305 for example have substantially identical dimensions. As an example, in projection along an axis orthogonal to the planes of plates 305 and 311, plates 305 and 311 are substantially confounded.

In this example, conductive plates 311 and 305 are arranged in planes substantially parallel to the planes comprising plates 301, 301' and 309. The mobile portion of the capacitor is capable of displacing in translation along a direction substantially orthogonal to the planes of plates 305 and 311 and to the planes of plates 301, 301' and 309. Thus, plate 311 may come closer to plate 305, thus resulting in bringing plate 309 closer to plate 301 and in drawing plate 309 away from plate 301', or may draw away from plate 305, thus resulting in drawing plate 309 away from plate 301 and in bringing plate 309 closer to plate 301'. The surface area of plate 309 facing plates 301 and 301' is however substantially invariant in this example.

The capacitor of FIGS. 4A and 4B further comprises a return spring 321 arrange to maintain the mobile portion of the capacitor in an idle position, for example, a position where the distance between plate 309 and plate 301 is substantially equal to the distance between plate 309 and plate 301', as illustrated in FIG. 4A, in the absence of a control signal applied between electrodes R and G.

In the shown example, the mobile portion of the capacitor comprises a beam 323 coupled to a fixed point PF1 via return spring 321 and a sliding joint 325. Conductive plates 309 and 311 are rigidly assembled to beam 323 parallel to the longitudinal axis of beam 323. As an example, spring 321 is a tension or compression spring having one end coupled to fixed point PF1 and having its other end coupled to beam 323 via sliding joint 325. In this example, the axis of the sliding joint is substantially orthogonal to the longitudinal axis of the beam. Thus, beam 323 can only displace in translation along an axis orthogonal to the planes of plates 301, 301', 309, 305, and 311.

The application of a control voltage Ue between electrodes G and R (referenced to electrode G), causes the occurrence of an electrostatic force between conductive plates 311 and 305, tending to bring plate 311 closer to plate 305, and thus plate 309 closer to plate 301, with no modification of the surface area of plate 309 facing plates 301 and 301'. Such a configuration is illustrated in FIG. 4B. Since capacitance Cs is equal to the sum of capacitance Cs1 formed between plates 309 and 301 and of capacitance Cs2 formed between plates 309 and 301', and capacitances Cs1 and Cs2 are respectively inversely proportional to distance d1 between plates 309 and 301 and inversely proportional to distance d2 between plates 309 and 301', this results in an increase in capacitance Cs.

A decrease in control voltage Ue conversely results in bringing conductive plate 309 back to its idle position, and thus in taking capacitance Cs back to its initial value.

An advantage of the capacitor of FIGS. 4A and 4B is that when plate 309 is equidistant from plates 301 and 301' (configuration of FIG. 4A), the value of capacitance Cs is independent from the value of voltage Us applied between the main electrodes S and D of the capacitor. This results from the fact that, in such a configuration, the electrostatic force exerted on plate 309 by plate 301 is compensated for by the electrostatic force exerted on plate 309 by plate 301'. Thus, the total electrostatic force exerted on plate 309 by electrode S orthogonally to the plane of plate 309, due to the application of a voltage Us between electrodes D and S, is substantially zero.

It should be noted that in the example of FIGS. 4A and 4B, sliding joint 325 is optional. As an example, spring 321 may be selected to have a relatively high stiffness along the axis of beam 323, to prevent any significant motion of plate 309 parallel to plates 301 and 301'.

Further, the described embodiments are not limited to the specific case mentioned hereabove where plate 309 is equidistant from plates 301 and 301' in the idle position of the capacitor, that is, when no signal is applied between electrodes R and G and between electrodes D and S. As a variation, in the idle state, plate 309 is closer to plate 301 than to plate 301', or conversely.

Figure 5A:
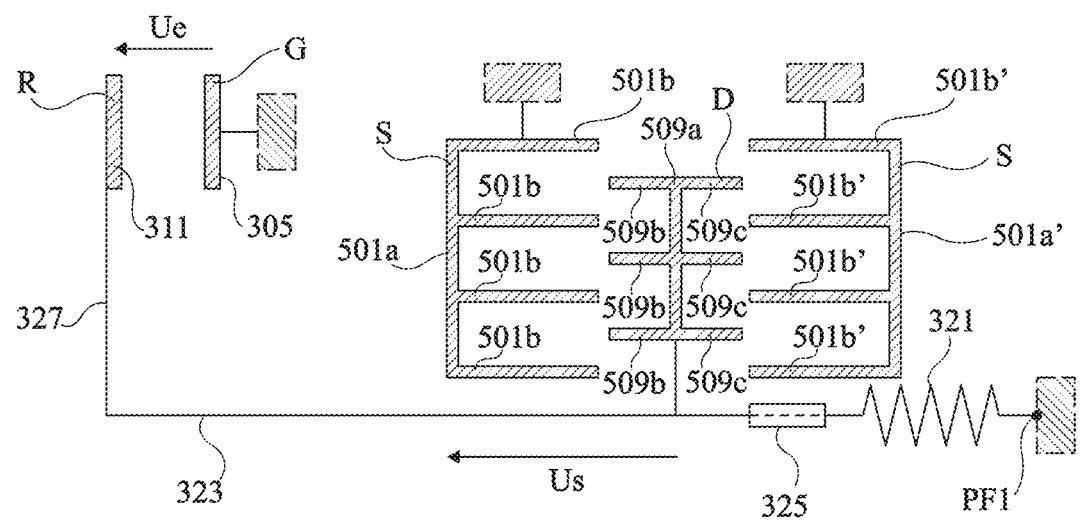
FIGS. 5A and 5B are cross-section views of another example of an electromechanical variable-capacitance capacitor with four electrodes according to an embodiment.
Figure 5B:
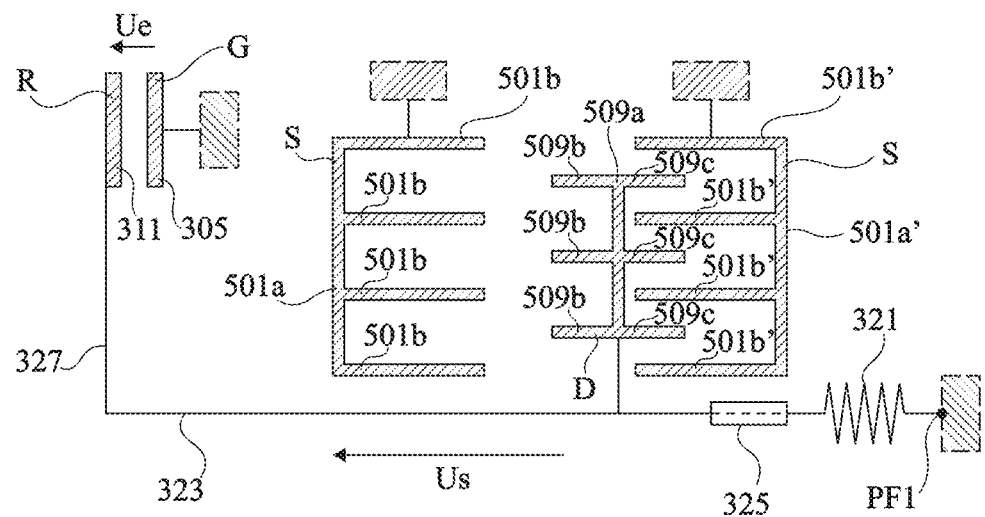

FIGS. 5A and 5B are cross-section views illustrating another example of an electromechanical variable-capacitance capacitor with four electrodes according to an embodiment.

The capacitor of FIGS. 5A and 5B comprises elements common with the capacitor of FIGS. 3A and 3B and differs from the capacitor of FIGS. 3A and 3B essentially by the shape of its main electrodes S and D.

In the capacitor of FIGS. 5A and 5B, electrode S is formed of two separate conductive parts 501 and 501', interconnected by a conductive connector, not shown in the drawings, and electrode D is made of a single conductive part 509.

In transverse cross-section view, that is, in the cross-section plane of FIGS. 5A and 5B, each of conductive parts 501 and 501' has the shape of a comb with simple teeth. In other words, each of parts 501 and 501' comprises a conductive plate 501a (respectively 501a'), corresponding to the bar of the comb, and a plurality of conductive plates 501b (respectively 501b') substantially parallel to one another and orthogonal to plate 501a (respectively 501a'), corresponding to the comb teeth. Plates 501b (respectively 501b') for example all substantially have the same dimensions. All plates 501b (respectively 501b') are attached by one edge to a same surface of plate 501a (respectively 501a'). As an example, in projection in the plane of a plate 501b (respectively 501b'), all plates 501b (respectively 501b') are confounded. Conductive parts 501 and 501' are for example substantially identical. In this example, conductive parts 501 and 501' face each other. More particularly, plates 501a and 501a' are substantially parallel to each other and facing each other, plates 501b being located on the side of the surface of plate 501a facing plate 501a' and plates 501b' being located on the side of the surface of plate 501a' facing plate 501a.

In the example of FIGS. 5A and 5B, conductive part 509 has, in transverse cross-section view, the shape of a comb with double teeth. In other words, part 509 comprises a conductive plate 509a, corresponding to the comb bar, a plurality of conductive plates 509b substantially parallel to one another and orthogonal to plate 509a, corresponding to first teeth of the comb, and a plurality of conductive plates 509c substantially parallel to plates 509b, corresponding to second teeth of the comb. As an example, plates 509b and 509c all have substantially the same dimensions. All plates 509b are attached by an edge to a same first surface of plate 509a and all plates 509c are attached by an edge to a same second surface, opposite to the first surface, of plate 509a. As an example, each plate 509b is aligned with a plate 509c, that is, each plate 509*b* is substantially located in the same plane as a plate 509*c*. As an example, in projection in the plane of a plate 509*b*, all plates 509*b* are confounded and, in projection in the plane of a plate 509*c*, all plates 509*c* are confounded.

In the capacitor of FIGS. 5A and 5B, conductive part 509 is arranged between conductive parts 501 and 501'. More particularly, plate 509*a* is substantially parallel to plates 501*a* and 501*a*' and is located between plates 501*a* and 501*a*'. Plates 509*b* of part 509 are located on the side of the surface of plate 509*a* facing plate 501*a* and plates 509*c* of part 509 are located on the side of the surface of plate 509*a* facing plate 501*a*'. Each tooth 509*b* of comb 509 is located in front of a free space separating two neighboring teeth of comb 501 and each tooth 509*c* of comb 509 is located in front of a free space separating two neighboring teeth of comb 501'. Each tooth 509*b*, respectively 509*c* of comb 509 is further located substantially at an equal distance from said neighboring teeth 501*b*, respectively 501*b*', of comb 501, respectively 501'.

In the example of FIGS. 5A and 5B, plates 501*a*, 509*a*, and 501*a*' of parts 501, 509, and 501' are substantially parallel to conductive plates 305 and 311 forming electrodes G and R of the capacitor (it being understood that plate 305 is mechanically fastened to parts 501 and 501' and electrically insulated from parts 501, 501', 509 and 311, and that plate 311 is mechanically fastened to part 509 and electrically insulated from parts 501, 501', 509, and 305). Plates 501*b*, 509*b*, 509*c* and 501*b*' have substantially the same orientation as plates 301 and 309 of the capacitor of FIGS. 3A and 3B.

As in the example of FIGS. 3A and 3B, the mobile portion of the capacitor is capable of displacing in translation along a direction substantially orthogonal to the plane of plates 305 and 311, that is, parallel to the planes of plates 501*b*, 509*b*, 509*c* and 501*b*'. Thus, plate 509*a* may draw away from plate 501*a* and come closer to plate 501*a*' or come closer to plate 501*a* and draw away from plate 501*a*'. However, the distance between the planes of plates 509*b* and 509*c* and the planes of plates 501*b* and 501*b*' is invariant.

In the example of FIGS. 5A and 5B, return spring 321 is arranged to maintain the mobile portion of the capacitor in an idle position where plate 509*a* of electrode D is substantially equidistant from plates 501*a* and 501*a*' of electrode S, as illustrated in FIG. 5A, in the absence of a control signal applied between electrodes R and G.

The application of a control voltage Ue between electrodes G and R (referenced to electrode G), causes the occurrence of an electrostatic force between conductive plates 311 and 305, tending to bring plate 311 closer to plate 305. This results in bringing plate 509*a* closer to plate 501*a*' and in drawing it away from plate 501*a*. The capacitor is then placed is a state such as illustrated in FIG. 5B, where comb 509 is interleaved with comb 501' and is not interleaved with comb 501. Capacitance Cs of the capacitor is then greater than its capacitance Cs in the idle state. Indeed, although the fact for conductive plates 509 and 501*a*' to be closer is compensated by the greater distance between conductive plates 509 and 501*a*, the interleaving between teeth 509*c* of comb 509 and teeth 501*b*' of comb 501' causes an increase in capacitance Cs, which is not compensated by the greater distance between teeth 509*b* of comb 509 and teeth 501*b* of comb 501.

As compared with the examples of FIGS. 3A and 3B, a specificity of the capacitor of FIGS. 5A and 5B is that, as for the capacitor of FIGS. 4A and 4B, there exists a single configuration of the capacitor where the value of capacitance Cs is independent from voltage Us applied between main electrodes S and D of the capacitor, that is, the configuration of FIG. 5A where conductive plate 509*a* of electrode D is equidistant from conductive plates 501*a* and 501*a*' of electrode S. Indeed, as soon as plate 509*a* is closer to plate 501*a*' than to plate 501*a*, the electrostatic force linked to voltage Us, exerted on part 509 by part 501' is no longer strictly compensated for by the electrostatic force exerted on part 509 by part 501, whereby the value of capacitance Cs is dependent on the value of voltage Us.

This type of operation where capacitance Cs of the capacitor is, in a first configuration, independent from voltage Us applied between the main electrodes of the capacitor and, in a second configuration, dependent on the voltage Us applied between the main electrodes of the capacitor, is advantageous for certain applications, and in particular for a use in adiabatic capacitive logic circuits of the type described in above-mentioned French patent application Nr. 1562812.

It should be noted that in the example shown in FIGS. 5A and 5B, in balanced position or in idle position (FIG. 5A), comb 509 is not interleaved with combs 501 and 501'. As a variation, comb 509 may be partially interleaved with combs 501 and 501' in the balanced position.

Figure 6:
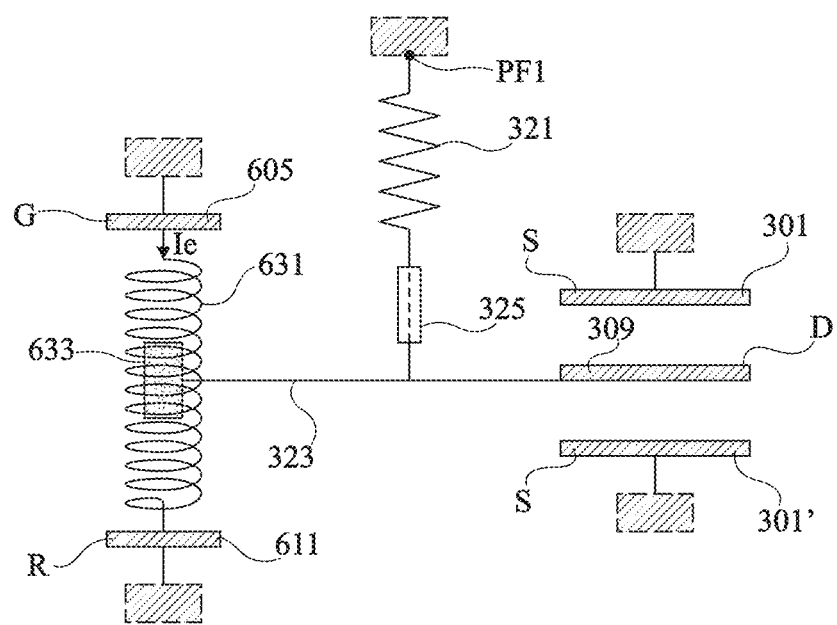
FIG. 6 is a cross-section view of another example of an electromechanical variable-capacitance capacitor with four electrodes according to an embodiment.

FIG. 6 is a cross-section view illustrating another example of an electromechanical variable-capacitance capacitor with four electrodes according to an embodiment. The capacitor of FIG. 6 comprises elements common with the capacitor of FIGS. 4A and 4B. Hereafter, only the differences between the two capacitors will be detailed.

The capacitor of FIG. 6 differs from the capacitor of FIGS. 4A and 4B mainly in that its actuation is of electromagnetic type and not electrostatic as in the example of FIGS. 4A and 4B.

More particularly, in the capacitor of FIG. 6, conductive plates 305 and 311 are replaced with an assembly comprising a conductive terminal 605, corresponding to electrode G of the capacitor, a conductive terminal 611, corresponding to electrode R of the capacitor, a conductive coil 631 having a first end connected to terminal 605 and having a second end connected to terminal 611, and a magnet 633 arranged inside of coil 631.

In this example, terminals 605 and 611 and coil 631 are elements of the fixed portion of the capacitor, and magnet 633 is an element of the mobile portion of the capacitor. In other words, terminals 605 and 611 and coil 631 are mechanically fastened to conductive plate 301 forming electrode S of the capacitor, and magnet 631 is mechanically fastened to conductive plate 309 forming electrode D of the capacitor. More particularly, in the shown example, magnet 633 is rigidly assembled to beam 323. In this example, the central axis of coil 631 is substantially orthogonal to conductive plates 301, 301', and 309.

The application of a control current Ie in coil 631 via electrodes G and R causes a displacement of magnet 633 along the central axis of the coil. This causes a displacement of conductive plate 309 orthogonally to conductive plates 301 and 301', with no modification of the surface area of plate 309 facing plates 301 and 301'. This results in a variation in the distance between plate 309 and plate 301, and thus in a corresponding variation of capacitance Cs of the capacitor between its main electrodes S and D.

Thus, unlike the capacitor of FIGS. 4A, 4B, which is voltage-controlled, the capacitor of FIG. 6 is current-controlled.

Of course, the mechanism of electromagnetic actuation of the capacitor of FIG. 6 can also be applied to the capacitors of FIGS. 3A, 3B and 5A, 5B, to replace the described electrostatic actuation mechanism.

More generally, other electromechanical actuation mechanisms may be provided, for example, based on piezoelectric elements. It should further be noted that although examples of electrostatic actuation mechanisms where conductive plates 305 and 311 forming electrodes G and R are parallel and displace with respect to each other along a direction orthogonal to said plates (that is, with no variation of the surface area of plate 305 facing plate 311), other electrostatic actuation mechanisms may be provided. In particular, an electrostatic actuation mechanism where plates 305 and 311 forming electrodes G and R are parallel but displace with respect to each other along a direction parallel to the plates (that is, with a variation of the surface area of plate 305 facing plate 311) may be provided.

Specific embodiments have been described. Various alterations, modifications, and improvements will occur to those skilled in the art. In particular, although only embodiments where the conductive plates forming the capacitor electrodes have substantially smooth surfaces have been shown in the drawings, the described embodiments are not limited to this specific case. As a variation, the conductive plates forming the capacitor electrodes, and particularly its main electrodes S and D, may comprise structures, for example, triangular or crenellated, to increase the facing surface areas of the conductive plates and thus increase the capacitance of the capacitor.

Further, the described embodiments are not limited to the specific examples of mechanical assemblies shown in the drawings. It will be within the abilities of those skilled in the art to provide other assemblies enabling to obtain the desired relative motions between the elements of the mobile portion and the elements of the fixed portion of the capacitor.

Further, it will be within the abilities of those skilled in the art to adapt the assembly according to the desired behavior of the capacitor, to obtain either a capacitor with a positive capacitance variation, that is, where the value of capacitance Cs increases when the value of control signal Ue or Ie applied between control electrodes R and G increases, or a capacitor with a negative capacitance variation, that is, where the value of capacitance Cs decreases when the value of control signal Ue or Ie increases.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A logic circuit comprising:
a variable-capacitance capacitor having first and second electrodes mobile with respect to each other, separated by an insulating region, and third and fourth electrodes electrically insulated from the first and second electrodes, capable of receiving a control signal to vary the relative position of the first and second electrodes in order to vary the capacitance between the first and second electrodes,
wherein:
the first electrode comprises first and second conductive parts fixed with respect to each other and electrically connected to each other; and
the second electrode comprises a third conductive part mobile with respect to the first and second conductive parts, the position of the third conductive part with respect to the first and second conductive parts being a function of the control signal applied between the third and fourth electrodes,
the logic circuit further comprising a control circuit configured for applying, between the third and fourth electrodes, a control signal adapted to place the third conductive part in a position with respect to the first and second conductive parts, such that whatever the voltage applied between the first and second electrodes, the electrostatic force exerted on the third conductive part by the first conductive part compensates for the electrostatic force exerted on the third conductive part by the second conductive part.

2. The logic circuit of claim 1, wherein the first, second, and third conductive parts are respectively first, second, and third conductive plates substantially parallel to one another, the third conductive plate being arranged between the first and second conductive plates, facing the first and second conductive plates.

3. The logic circuit of claim 2, wherein the distance between the third conductive plate and the first and second conductive plates is variable and wherein a surface area of the third conductive plate facing the first and second conductive plates is substantially invariant.

4. The logic circuit of claim 2, wherein said at least one position is such that the third conductive plate is at an equal distance from the first and second conductive plates.

5. The logic circuit of claim 1, wherein:
the first and second conductive parts each have, in transverse cross-section, the shape of a comb with simple teeth; and
the third conductive part is located between the first and second conductive parts and has, in transverse cross-section, the shape of a comb with double teeth.

6. The logic circuit of claim 1, wherein the third electrode comprises a fourth conductive plate mechanically fastened to the second electrode and the fourth electrode comprises a fifth conductive plate mechanically fastened to the first electrode, the fourth and fifth conductive plates being substantially parallel to each other.

7. The logic circuit of claim 1, wherein the third and fourth electrodes are conductive terminals mechanically fastened to the first electrode, the capacitor further comprising a conductive coil coupling the third and fourth electrodes, and a magnet mechanically fastened to the second electrode, arranged inside of the coil.

8. The logic circuit of claim 1, comprising a return spring arranged to maintain the first and second electrodes in an idle position, in the absence of an electric signal applied between the third and fourth electrodes and between the first and second electrodes.

9. The logic circuit of claim 8, wherein the return spring mechanically couples the second electrode to a point mechanically fastened to the first electrode, via a sliding joint.

* * * * *